US012584543B2

(12) United States Patent
Garrec

(10) Patent No.: US 12,584,543 B2
(45) Date of Patent: Mar. 24, 2026

(54) CABLE ACTUATOR WITH IMPROVED COMPACTNESS

(71) Applicant: COMMISSARIAT A L'ENERGIE ATOMIQUE ET AUX ENERGIES ALTERNATIVES, Paris (FR)

(72) Inventor: Philippe Garrec, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/873,377

(22) PCT Filed: Jun. 8, 2023

(86) PCT No.: PCT/FR2023/050821
§ 371 (c)(1),
(2) Date: Dec. 10, 2024

(87) PCT Pub. No.: WO2023/247850
PCT Pub. Date: Dec. 28, 2023

(65) Prior Publication Data
US 2025/0320910 A1      Oct. 16, 2025

(30) Foreign Application Priority Data

Jun. 23, 2022    (FR) ...................................... 2206265

(51) Int. Cl.
*F16H 19/06* (2006.01)
*F16H 25/20* (2006.01)
(52) U.S. Cl.
CPC ......... *F16H 19/0622* (2013.01); *F16H 25/20* (2013.01); *F16H 2025/204* (2013.01)
(58) Field of Classification Search
CPC .. F16H 20/20; F16H 19/0622; F16H 19/0645; F16H 2025/204;

(Continued)

(56) References Cited

U.S. PATENT DOCUMENTS 5,974,904 A    11/1999   Dirschbacher et al.
2006/0191362 A1    8/2006   Garrec
(Continued)

FOREIGN PATENT DOCUMENTS

DE      10 2013 017 244 A1    4/2015
EP         0 828 093 A2    3/1998
(Continued)

OTHER PUBLICATIONS

International Search Report issued Sep. 12, 2023 in PCT/FR2023/050821, filed on Jun. 8, 2023, 2 pages.

(Continued)

*Primary Examiner* — Bobby Rushing, Jr.
(74) *Attorney, Agent, or Firm* — Oblon, McClelland, Maier & Neustadt, L.L.P.

(57) ABSTRACT

An actuator includes a frame, a screw/nut assembly including a nut which engages with a screw extending along a longitudinal axis, a motor arranged to rotate the screw and bring about a linear movement of the nut, the actuator further includes a single pair of return mechanisms having a first return mechanism and a second return mechanism which are rotatably mounted on the frame, the first return mechanism being connected to an output of the actuator, a first transmission member for transmitting a pulling force connected to the nut by its first end and its second end, which transmission member engages with the first return mechanism and the second return mechanism, and an anti-rotation device for preventing the nut from rotating relative to the screw.

8 Claims, 6 Drawing Sheets

(58) Field of Classification Search
CPC ....... F16H 2025/2043; F16H 2019/085; F16H
2025/2075; F16H 2025/2096; B25J 9/104
See application file for complete search history.

(56) References Cited

U.S. PATENT DOCUMENTS

| | | | |
|---|---|---|---|
| 2020/0172383 A1 | 6/2020 | Garrec | |
| 2020/0281799 A1* | 9/2020 | Geffard | B25J 9/104 |

FOREIGN PATENT DOCUMENTS

| | | | |
|---|---|---|---|
| FR | 2 852 373 A1 | 9/2004 | |
| FR | 3084921 A1* | 2/2020 | F16H 25/20 |
| FR | 3115084 A1* | 4/2022 | F16H 25/2204 |
| WO | WO 2019/029976 A1 | 2/2019 | |

OTHER PUBLICATIONS

French Preliminary Search Report & Written Opinion issued Jan. 13, 2023 in FR application 2206265 filed on Jun. 23, 2022, 19 pages (with English Translation of Categories of Cited Documents).

* cited by examiner

Fig.6

CABLE ACTUATOR WITH IMPROVED COMPACTNESS

TECHNICAL FIELD OF THE INVENTION

The invention relates to a cable actuator including a screw/nut assembly, the nut of which is able to move in translation and is connected by means of cables to an element to be moved.

PRIOR ART

Cable actuators are known including a motorised screw extending along a longitudinal axis and which is mounted on a frame. A nut engages with the screw and is associated with anti-rotation means so that a relative rotation of the screw and nut causes a linear movement of the nut. A first cable, the ends of which are connected to the nut, makes a first loop between a first pulley and a second pulley of a first pair of pulleys. A second cable, the ends of which are connected to the nut, makes a second loop between a third pulley and a fourth pulley of a second pair of pulleys. The first and third pulleys are generally constrained to rotate with one and the same shaft and are connected to an output of the actuator. Such a system is therefore a rotary-output actuator. Conventionally, the first pair of pulleys and the second pair of pulleys are placed on either side of the screw so that the strands of the first cable that extend between the nut and the pair of pulleys and the strands of the second cable that extend between the nut and the second pair of pulleys are located in one and the same plane, which comprises the longitudinal axis. Such an arrangement is necessary in order to balance the forces applied to the nut and to limit friction on the nut and the risks of jamming thereof relative to the screw. However, because of uncertainties in implementation, parasitic kinematic oscillations of the nut with respect to the screw and misalignments of the strands, this balance is not a simple matter. An actuator is obtained which, although having a total length close to the maximum travel of the nut, has appreciable bulk in terms of width (considered in a direction parallel to the rotation axes of the pairs of pulleys) and in terms of height (considered in a direction orthogonal to the rotation axes of the pulleys and to the longitudinal axis). This is because the maximum width of such a cable actuator corresponds to that of the nut and of the two pulleys, when its minimum height corresponds to half of the height of the nut, to which the height of the pulleys is added.

Cable actuators also exist including a motorised nut mounted on a frame and which engages with a screw extending along a longitudinal axis. The screw has anti-rotation means so that a rotation of the nut causes a linear movement of the screw. A first cable, the ends of which are connected to the ends of the screw, makes a loop between a first pulley and a second pulley of a first pair of pulleys. The first pulley and the second pulley are included in a plane normal to the rotation axis of the pulleys and which comprises the longitudinal axis. The pulleys are positioned relative to the longitudinal axis so that the latter is tangent to the pulleys. Such an arrangement of the pulleys and of the screw is necessary in order to cause no bending on the screw and thus to limit the friction and the risks of jamming of the screw relative to the nut. This type of cable actuator has reduced width compared with the type of actuator previously described but has a total length substantially equal to twice the maximum travel of the actuator, to which approximately the length of the screw is added. The minimum height of the actuator is also substantially equal and corresponds to half of the height of the nut, to which the height of the pulleys is added.

Thus, these cable actuators are still considered to be unsuitable for producing very compact miniaturised actuators whereas they have particularly advantageous characteristics in terms of force delivered and of linearity.

PRESENTATION OF THE INVENTION

The object of the invention is to improve the compactness of a cable actuator.

For this purpose, an actuator is provided comprising a frame, a screw/nut assembly comprising a nut engaging with a screw extending along a longitudinal axis, arranged to rotate the screw and to cause a linear movement of the nut. According to the invention, the actuator also comprises a single pair of return mechanisms comprising a first return mechanism and a second return mechanism both rotatably mounted on the frame, the first return mechanism being connected to an output of the actuator. A first member transmitting a pulling force is connected to the nut by its first end and its second end and engages with the first return mechanism and the second return mechanism.

A cable actuator is then obtained which, using a single pair of return mechanisms, has reduced width and also has a total length close to the maximum travel of the nut.

Advantageously, the first member transmitting a pulling force is a cable or a notched belt.

The compactness of the actuator is improved when the anti-rotation device comprises a carriage connected firstly to the nut and secondly to the first member transmitting a pulling force.

It is possible to further improve the compactness of the actuator when the anti-rotation device comprises a mechanism for guiding a translation in a direction parallel to the longitudinal axis of the carriage relative to the frame.

Advantageously, the guidance mechanism is a prismatic linear guidance mechanism and/or comprises two points for guiding in translation.

According to a preferred embodiment, the carriage is connected to the nut by a first pair of cables comprising a second cable and a third cable extending on either side of the screw as well as by a second pair of cables comprising a fourth cable and a fifth cable extending on either side of the screw.

The operation of the actuator is further improved when the second cable and the third cable are connected to the nut by a first intermediate support connected to the nut by a seventh cable and an eighth cable and/or the fourth cable and the fifth cable are connected to the nut by a second intermediate support connected to the nut by a ninth cable and a tenth cable. This is because this design allows tolerances in positioning and parallelism of the guidance and of the screw as well as the parasitic kinematic oscillations of the nut with respect to the screw, which is particularly favourable for the reduction and evenness of the friction.

Highly preferentially, the actuator comprises a device for tensioning the second and/or the third cable. Since these cables are very short, they can be selected for their strength rather than for their stiffness, which can help to reduce the diametral size of the nuts.

It is possible to increase the rigidity of the system or to increase the transmissible force when the first pulley and the second pulley have a plurality of grooves for accommodating additional actuation cables.

Likewise, a notched belt can be used instead of actuation cables to increase for example the articular movement instead of having recourse to pulleys with more expensive helical cables.

Other features and advantages of the invention will emerge from the reading of the following description of a particular non-limitative embodiment of the invention.

BRIEF DESCRIPTION OF THE FIGURES

FIG. 6 is a schematic representation in plan view and in side view of the actuator in FIG. 5.

DESCRIPTION OF EMBODIMENTS

Figure 1:
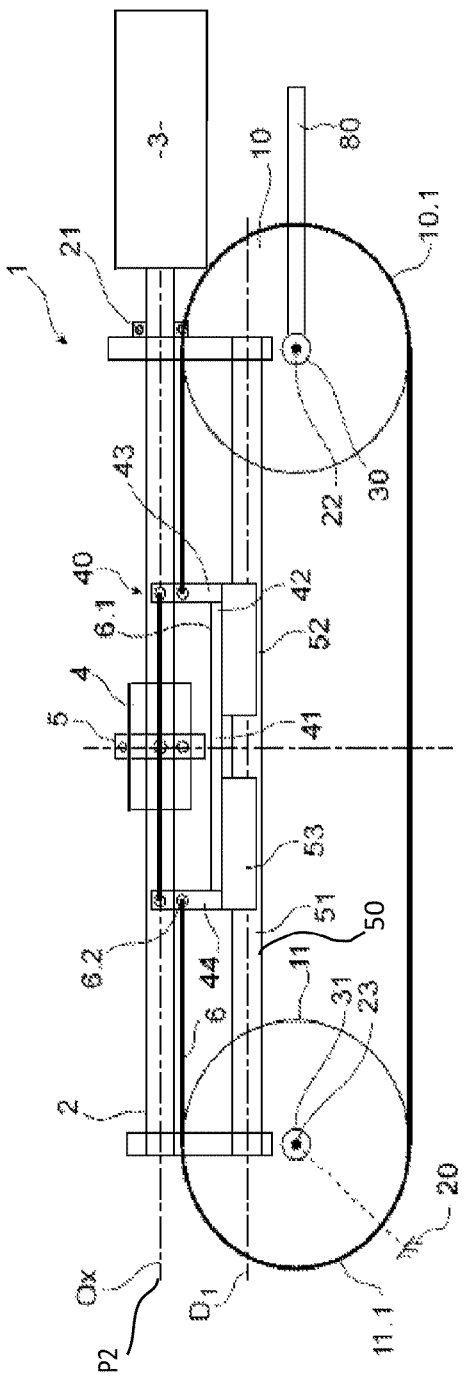
FIG. 1 is a schematic representation in plan view and in front view of an actuator according to a first embodiment of the invention.

With reference to FIG. 1, the actuator of the invention, designated 1 overall, comprises a frame 20 on which a bearing 21 is mounted which accommodates a screw 2 for rotation about a longitudinal axis Ox. The screw 2 is a ball screw and is rotated by an electric motor 3. A nut 4 engages with the screw 2 and comprises a ring 5 projecting radially from the nut 4.

The actuator 1 comprises a single pair of pulleys comprising a first pulley 10 mounted for rotation about a first shaft 22 secured to the frame 20 by means of a first ball bearing 30 and a second pulley 11 mounted for rotation about a second shaft 23 connected to the frame 20 by means of a second ball bearing 31. A first actuation cable 6 engages with the first pulley 10 and the second pulley 11. The cable 6 is connected to the nut 4 at its first end 6.1 and second end 6.2 in accordance with methods that will be described hereinafter.

The actuator 1 comprises an anti-rotation device 40 for preventing the nut 4 from rotating in relation to the screw 2. The anti-rotation device 40 includes a carriage 41 mounted so as to be able to move in translation in a direction D1 parallel to the axis Ox by means of a guidance mechanism 50. The mechanism 50 is here a prismatic linear guidance that comprises a rail 51 on which a first shoe 52 and a second shoe 53 slide, both secured to the carriage 41.

Figure 2:
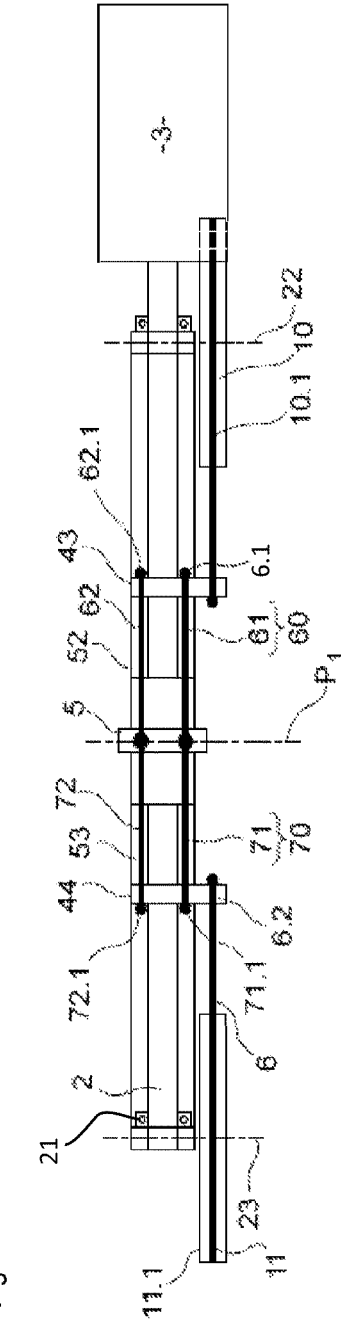
FIG. 2 is a schematic representation in plan view and in a view from above of the actuator of FIG. 1.

The carriage 41 comprises a base 42 that extends substantially parallel to the longitudinal axis Ox and at the ends of which a first arm 43 and a second arm 44 project. The carriage 41 is connected to the nut 4 by a first pair of cables 60 comprising a second cable 61 and a third cable 62 extending on either side of the screw 2 as well as by a second pair of cables 70 comprising a fourth cable 71 and a fifth cable 72 extending on either side of the screw 2. As can be seen in FIG. 2, the first pair of cables 60 and the second pair of cables 70 extend in a direction substantially parallel to the longitudinal axis and the first pair of cables 60 and the second pair of cables are located on either side of the first plane P1 passing through the nut 4 and which is normal to the screw 2. More precisely, a third end 61.1 of the cable 61 and a fourth end 62.1 of the cable 62 are crimped on the arm 43. Symmetrically, a fifth end 71.1 of the cable 71 and a sixth end 72.1 of the cable 72 are crimped on the arm 44.

The second cable 61, the third cable 62, the fourth cable 71 and the fifth cable 72 are crimped at their other ends to the ring 5.

As can be seen in FIGS. 1 and 2, the first cable 6 has its first end 6.1 that is crimped to the arm 43 and extends parallel to the longitudinal axis Ox as far as the first pulley 10 to engage in the first groove 10.1 and to make a winding half-turn over the first pulley 10. The first cable 6 extends at the exit from the first pulley 10 parallel to the longitudinal axis Ox to engage in the second groove 11.1 of the second pulley 11 and to make therein a winding half-turn. The first cable 6 next extends as far as the arm 44 on which the second end 6.2 of the first cable 6 is crimped. In order to limit the friction between the cable 6 and the pulleys 10 and 11, the cable 6 is preferentially connected by crimping to the pulley 10 or even also to the pulley 11.

The first pulley 10 is constrained to rotate with a finger 80 that constitutes the output of the actuator 1. The finger 80 here corresponds to a phalanx of a mechanised hand, not shown.

In operation, under the effect of a command sent to the motor 3, a rotation of the screw 2 causes an identical rotation of the nut 4 because of the contact frictions between the screw 2 and the nut 4. This movement tensions the first pair of cables 60 and the second pair of cables 70. The pairs of cables 60 and 70 being connected to the carriage 41—only the movement of the latter along the axis Ox being enabled—the pairs of cables 60 and 70 exert forces opposing a rotational driving of the nut 4 by the screw 2. Thus, a rotation of the screw 2 under the action of the motor 3 causes a linear movement of the nut 4 along the longitudinal axis Ox. This movement is transmitted by the pairs of cables 60 and 70 to the carriage 41, to which the cable 6 is connected. The linear movement of the carriage 41 drives the cable 6, which causes a rotation of the pulley 10 and an actuation of the finger 80.

A cable actuator 1 is then obtained that has a reduced width and a total length close to the maximum travel of the nut 4.

As can be seen in FIG. 1, the connections of the ends 6.1 and 6.2 of the first cable 6 to the carriage 41 are located below (according to the representation in FIG. 1) a second plane P2 orthogonal to the first plane P1 and which comprises the longitudinal axis Ox.

The elements identical or similar to those described above will bear a numerical reference identical to the one in the following description of a second embodiment of the invention.

Figure 3:
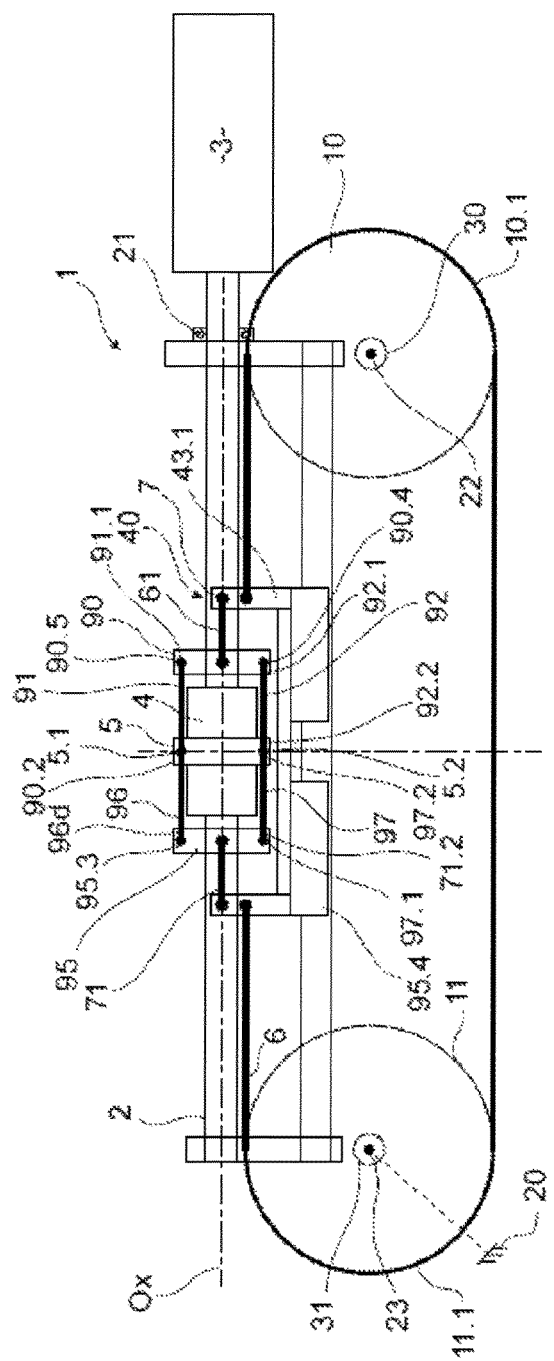
FIG. 3 is a schematic representation in plan view and in front view of an actuator according to a second embodiment of the invention.
Figure 4:
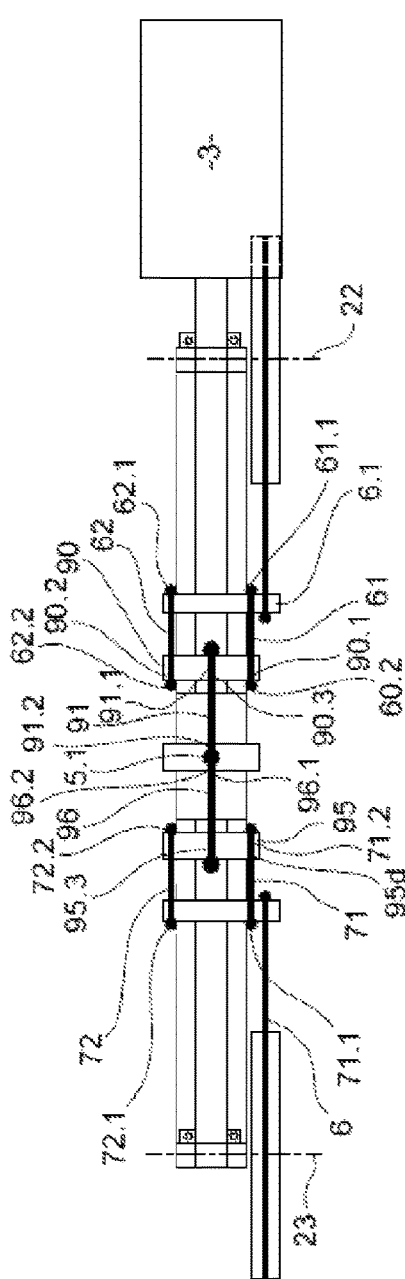
FIG. 4 is a schematic representation in plan view and in a view from above of the actuator of FIG. 3.

According to a second embodiment of the invention shown in FIGS. 3 and 4, a second end 61.2 of the second cable 61 and an eighth end 62.2 of the third cable 62 are connected to the nut 4 by a first intermediate support 90 connected to the nut 4 by a seventh cable 91 and an eighth cable 92. The first intermediate support 90 is here in the form of a ring and comprises a first piercing 90.1 in which the seventh end 61.2 of the cable 61 is crimped. The first intermediate support 90 also comprises a second piercing 90.2 diametrically opposed to the first piercing 90.1 and in which the eighth end 62.2 of the cable 62 is crimped.

The first intermediate support 90 also comprises a third piercing 90.3 in which a ninth end 91.1 of the seventh cable 91 is crimped and a sixth piercing 90.4 in which the tenth end 92.1 of the cable 92 is crimped. The eleventh end 91.2 of the cable 91 is crimped in a seventh piercing 5.1 of the ring 5 and the twelfth end 92.2 of the cable 92 is crimped in an eighth piercing 5.2 of the ring 5.

Similarly, the thirteenth end 71.2 of the fourth cable 71 and the fourteenth end 72.2 of the fifth cable 72 are connected to the nut 4 by a second intermediate support 95 connected to the nut 4 by a ninth cable 96 and a tenth cable 97. The second intermediate support 95 is here in the form of a ring and comprises a seventh piercing 95.1 in which the thirteenth end 71.2 of the cable 71 is crimped. The second intermediate support 95 also comprises an eighth piercing 95.2 diametrically opposite to the seventh piercing 95.1 and in which the fourteenth end 72.2 of the cable 72 is crimped.

The second intermediate support 95 also comprises a ninth piercing 95.3 in which the fifteenth end 96.1 of the ninth cable 96 is crimped and a tenth piercing 95.4 in which the sixteenth end 97.1 of the tenth cable 97 is crimped.

The seventeenth end 96.2 of the cable 96 is crimped in seventh piercing 5.1 and the eighteenth end 97.2 of the tenth cable 97 is crimped in the eighth piercing 5.2.

Optionally, the third end 61.1 of the cable 61 is here not crimped to the arm 43 but is secured to a threaded end piece that passes through a ninth piercing 43.1 in the arm 43. A knurled nut is engaged on the threaded end piece and has one of its faces coming into abutment on the arm 43. An action on the nut makes it possible to tension the cables 61, 62, 71, 72, 91, 92, 96 and 97.

Figure 5:
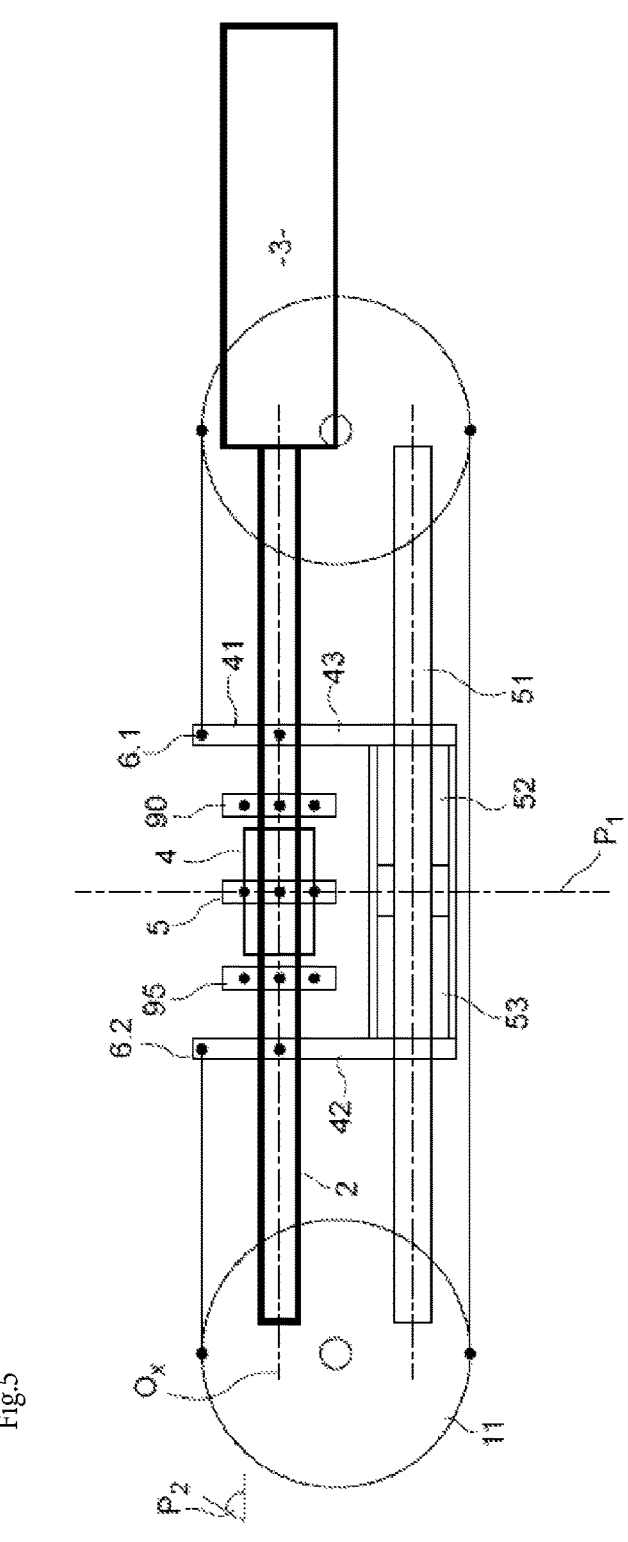
FIG. 5 is a schematic representation in plan view and in front view of an actuator according to a third embodiment of the invention.
Figure 6:
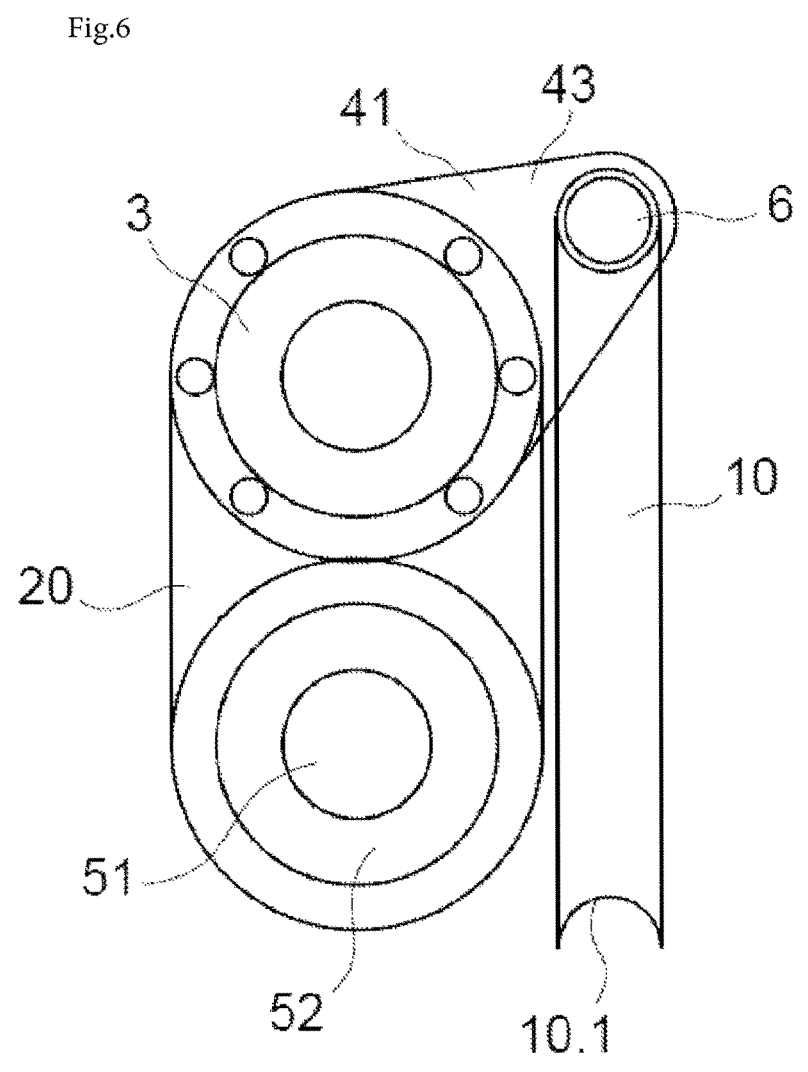

According to a third embodiment shown in FIGS. 5 and 6, the connections of the ends 6.1 and 6.2 of the first cable 6 to the carriage 41 are located above a second plane P2 orthogonal to the first plane P1 and which comprises the longitudinal axis Ox. This configuration makes it possible to reduce further the footprint of the actuator 1 without causing parasitic forces on the screw 2/nut 4 assembly.

In all the embodiments described, the cables 6, 61, 62, 71, 72, 91, 92, 96 and 97 are advantageously preloaded.

Naturally the invention is not limited to the embodiments described but encompasses any variant falling within the field of the invention as defined by the claims.

In particular, although here the actuator comprises a ball screw, the invention also applies to other types of screw such as for example screws with simple threads, or rollers;

although the first cable is connected to the nut by crimping implemented in a ring secured to the nut, the invention also applies to other means of connecting a cable to the nut such as for example crimping in a piercing made in the nut, gluing or welding;

although here the cables extend parallel to the longitudinal axis, the invention also applies to other configurations of the cables in which no section or a single section of the cables extends parallel to the longitudinal axis, the rest of the cable being able to adopt any orientation with respect to the longitudinal axis;

although here all the cables of the actuator are preloaded, the invention also applies to a single preloaded cable or only a fraction of the preloaded cables;

although here the first pulley and the second pulley are pulleys with a cylindrical groove, the invention also applies to second and fourth pulleys provided with grooves of different types, such as for example helical grooves;

although here only one cable is engaged on the first pair of pulleys, the invention also applies to a pair of pulleys that have a plurality of grooves for accommodating additional actuation cables;

although here the first cable engages with the two pulleys, the invention also applies to a first cable that comprises a first strand connecting the nut (via the frame) and the first pulley, and then a second strand distinct from the first that has one of its ends connected by crimping to the first pulley and the other of its ends connected by crimping to the second pulley. Finally, the first cable can comprise a third strand one end of which is crimped on the second pulley and the other end of which is connected to the nut (via the frame). All the distinct strands forming a first cable that cooperates with the first and second pulley for implementing a transmission between two points of connection to the nut;

although here the anti-rotation device comprises cables connecting the nut to a linearly guided carriage, the invention also applies to other types of anti-rotation such as for example one or more rollers secured to the nut and engaged in one or more grooves or a connection shaft of the nut with linear guidance;

although here the actuator comprises a guidance mechanism with two translational guidance points, the invention also applies to a guidance mechanism comprising a different number of guidance points such as for example a single guidance point or more than two;

although here the guidance mechanism is a prismatic linear guidance, the invention also applies to other types of guidance of a translation such as for example one or more sliding pivots;

although here the linear guidance comprises two shoes engaging with a rail, the invention also applies to other types of linear guidance, such as for example a prismatic linear guidance using one or more shoes with ball recirculation or a linear guidance comprising a socket with ball recirculation mounted on a fluted shaft;

although here the first cable is connected by crimping to the pulleys, invention also applies to other methods for cooperation of the first cable with the pulleys such as for example a connection by friction, for example by means of one or more dead turns of the cable around the pulley;

although here the output of the actuator is a finger constrained to rotate with the first pulley, the invention also applies to other types of output of the actuator such as for example an output secured to the first cable and which makes a translation to obtain a linear actuator;

although here the third end of the second cable comprises a threaded end piece engaging with a knurled nut, the invention also applies to other types of device for tensioning the second and/or the third cable such as for example a catch assembly of the fir tooth type or an eccentric roller;

although here the actuator comprises a cable connected to the nut and engaging with smooth pulleys, the invention also applies to other types of member for transmitting a pulling force, such as for example a chain, a belt, notched or not, or a hybrid member comprising linkages connected by cable;

although here the cables engage with pulleys, the invention also applies to other types of direction return mechanisms adapted to other types of member for transmitting a force, such as for example pinions for chains, wheels, notched or not, for notched belts, or guidance rollers for straps or tapes.

The invention claimed is:

1. An actuator comprising:

a frame;

a screw/nut assembly comprising a nut engaging with a screw extending along a longitudinal axis;

a motor arranged to rotate the screw and to cause a linear movement of the nut;

a single pair of return mechanisms comprising a first return mechanism and a second return mechanism both rotatably mounted on the frame, the first return mechanism being connected to an output of the actuator;

a first member for transmitting a pulling force connected to a first arm by its first end and to a second arm by its second end and which engages with the first return mechanism and the second return mechanism;

an anti-rotation device for preventing the nut from rotating relative to the screw, wherein the anti-rotation device comprises a carriage connected firstly to the nut and secondly to the first member for transmitting a pulling force, wherein the carriage includes the first arm and the second arm and is connected to the nut by a first pair of cables comprising a second cable and a third cable extending on either side of the screw and by a second pair of cables comprising a fourth cable and a fifth cable extending on either side of the screw, wherein the first pair of cables and the second pair of cables extend in a direction substantially parallel to the longitudinal axis, wherein the first pair cables and the second pair cables are located on either side of a first plane passing through the nut and which is normal to the screw, wherein the anti-rotation device comprises a mechanism for guiding a translation, in a direction parallel to the longitudinal axis, of the carriage relative to the frame, and wherein the guidance mechanism is a prismatic linear guidance mechanism.

2. The actuator according to claim 1, wherein the first member for transmitting a pulling force is a cable or a notched belt.

3. The actuator according to claim 1, wherein the guidance mechanism comprises two translational guidance shoes.

4. The actuator according to claim 1, wherein the second cable and the third cable are connected to the nut by a first intermediate support connected to the nut by a seventh cable and an eighth cable.

5. The actuator according to claim 1, wherein the fourth cable and the fifth cable are connected to the nut by a second intermediate support connected to the nut by a ninth cable and a tenth cable.

6. The actuator according to claim 1, comprising a device for tensioning the second cable and/or the third cable.

7. The actuator according to claim 1, wherein the first return mechanism and the second return mechanism have a plurality of grooves for accommodating additional members for transmitting a pulling force.

8. An actuator comprising:

a frame;

a screw/nut assembly comprising a nut engaging with a screw extending along a longitudinal axis;

a motor arranged to rotate the screw and to cause a linear movement of the nut;

a single pair of return mechanisms comprising a first return mechanism and a second return mechanism both rotatably mounted on the frame, the first return mechanism being connected to an output of the actuator;

a first member for transmitting a pulling force connected to the nut by its first end and its second end and which engages with the first return mechanism and the second return mechanism;

an anti-rotation device for preventing the nut from rotating relative to the screw, wherein the carriage is connected to the nut by a first pair of cables comprising a second cable and a third cable extending on either side of the screw and by a second pair of cables comprising a fourth cable and a fifth cable extending on either side of the screw, wherein the first pair of cables and the second pair of cables extend in a direction substantially parallel to the longitudinal axis, wherein the first pair cables and the second pair cables are located on either side of a first plane passing through the nut and which is normal to the screw, and wherein the second cable and the third cable are connected to the nut by a first intermediate support connected to the nut by a seventh cable and an eighth cable.

* * * * *